US006658334B2

(12) United States Patent
Boswell et al.

(10) Patent No.: US 6,658,334 B2
(45) Date of Patent: Dec. 2, 2003

(54) STATIC STEERING ANGLE REDUCING ALGORITHM FOR FOUR WHEEL STEERING SYSTEMS

(75) Inventors: Karen A. Boswell, Freeland, MI (US); Michael D. Byers, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/067,641

(22) Filed: Feb. 4, 2002

(65) Prior Publication Data

US 2003/0028305 A1 Feb. 6, 2003

Related U.S. Application Data

(60) Provisional application No. 60/309,434, filed on Aug. 1, 2001.

(51) Int. Cl.[7] .................................................. G06F 7/00
(52) U.S. Cl. ................................... 701/41; 280/6.2
(58) Field of Search .......................... 701/41; 280/5.51, 280/6.2; 340/426.31

(56) References Cited

U.S. PATENT DOCUMENTS 6,564,131 B2 * 5/2003 Sebastian et al. ............. 701/41

* cited by examiner

Primary Examiner—Yonel Beaulieu
(74) Attorney, Agent, or Firm—Michael D. Smith

(57) ABSTRACT

A method for controlling the rear steering angle of a vehicle includes calibrating a static vehicle speed threshold, detecting an actual vehicle speed below the calibrated static vehicle speed threshold, determining whether the phase of a rear steering angle is correct in response to the detected speed below threshold, ramping to zero the rear steering angle if the determined phase is not correct, deciding whether the rear steering angle is greater than a desired rear steering angle if the determined phase is correct, and ramping down the rear steering angle to the desired rear steering angle in response to the decidedly greater angle by commanding an electric motor operably coupled to the steering rack.

16 Claims, 3 Drawing Sheets

STATIC STEERING ANGLE REDUCING ALGORITHM FOR FOUR WHEEL STEERING SYSTEMS

CROSS-REFERENCE TO RELATED APPLICATION

This application claims the benefit of U.S. provisional application No. 60/309,434, filed Aug. 1, 2001, the contents of which are incorporated by reference herein in their entirety.

BACKGROUND

In vehicular applications, a typical four-wheel steering system steers the front and the rear wheels of a vehicle. More specifically, a rear wheel steering portion of the system may produce a desired rear wheel steering angle to improve directional stability at high speeds and maneuverability at low speeds. The high-speed steering method may reduce vehicle yaw by steering the front and rear wheels in the same direction, or in phase, and thereby improve vehicle safety. The low speed steering method may achieve tight turning radii at low speeds by steering the front and rear wheels in different directions, or out of phase, to thereby reduce the effective turning radius of the vehicle.

In the rear wheel steering portion of a four-wheel steering system, an electric motor is typically employed to steer the rear wheels. Attempting to turn the rear wheels when the vehicle is substantially stopped, or when the steered wheels are otherwise static and not rolling, places high torque loads on the electric motor. Achieving high torque loads mandates utilization of larger motors, requiring larger size and weight, and may result in less precise control.

SUMMARY

The above described and other features are exemplified by the following Figures and Description in which a vehicular system is disclosed that includes a controller and an electric motor in signal communication with the controller for receiving current and rotating at speed; while the controller implements a method for controlling the rear steering angle of a vehicle that includes calibrating a static vehicle speed threshold, detecting an actual vehicle speed below the calibrated static vehicle speed threshold, determining whether the phase of a rear steering angle is correct in response to the detected speed below threshold, ramping to zero the rear steering angle if the determined phase is not correct, deciding whether the rear steering angle is greater than a desired rear steering angle if the determined phase is correct, and ramping down the rear steering angle to the desired rear steering angle in response to the decidedly greater angle by commanding an electric motor operably coupled to the steering rack.

BRIEF DESCRIPTION OF THE DRAWINGS

Exemplary embodiments will now be described by way of example with reference to the accompanying drawings wherein like reference numerals designate like features in the several figures, in which.

DETAILED DESCRIPTION OF PREFERRED EMBODIMENTS

Figure 1:
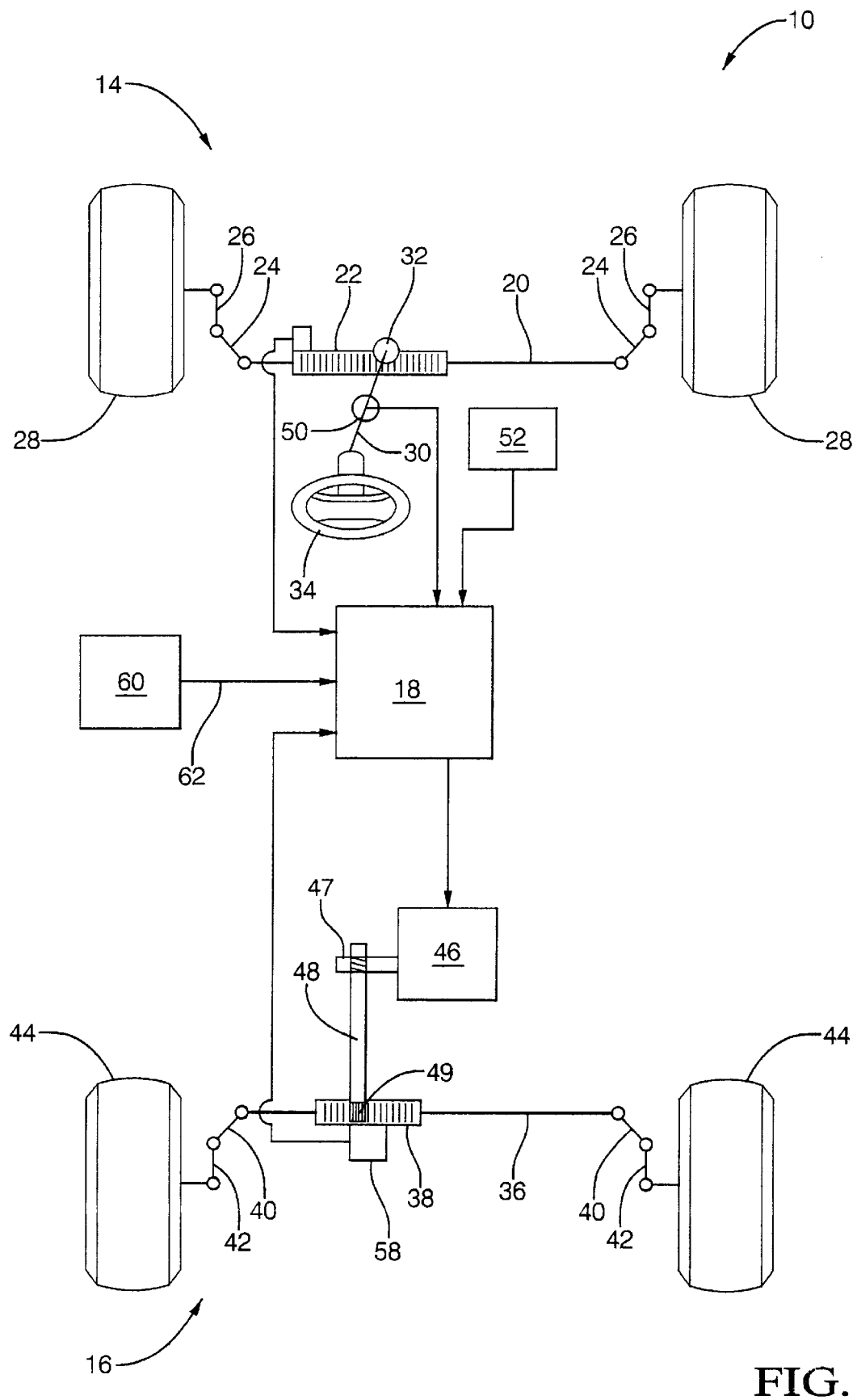
FIG. 1 is a schematic diagram of a vehicular four-wheel steering system.

As shown in FIG. 1, a vehicular four-wheel steering system is indicated generally by the reference numeral 10. The system 10 includes a controller 18 coupled to various sensors and interfaces for performing a variety of processes prescribed by the desired controlling functions.

The system 10 is incorporable into a vehicle (not shown) to provide enhanced steering and directional control of the vehicle. The system 10 comprises a front steering mechanism, shown generally at 14, a rear steering mechanism, shown generally at 16, and a controller 18 in signal communication with the front steering mechanism 14 and the rear steering mechanism 16. Although the system 10 is described as being applicable to a rack and pinion steering arrangement, the system 10 is adaptable to other steering arrangements including, for example, integral gear steering systems.

The front steering mechanism 14 comprises a rack shaft 20, a rack 22 disposed intermediately between opposing ends of the rack shaft 20, a tie rod 24 disposed on each opposing end of the rack shaft 20, a knuckle arm 26 connected to each tie rod 24, and a front steerable wheel 28 rotatably disposed on each knuckle arm 26. The rack shaft 20, tie rods 24, and knuckle arms 26 are configured such that the front steerable wheels 28 can pivot in unison relative to the vehicle to steer or to effect a change in the direction of travel while the vehicle is moving.

The front steering mechanism 14 further comprises a mechanism through which a vehicle operator can effectuate a desired change in the direction of travel of the vehicle. Such a mechanism comprises a steering column 30 disposed in operable communication at one end with the rack 22 through a pinion 32 and at an opposing end thereof with a steering device 34. The steering device 34 may be a hand steering wheel, or "hand-wheel". Manipulation of the steering device 34, i.e., rotation of the hand-wheel, causes the axial rotation of the steering column 30, which in turn causes the rotation of the pinion 32. Rotation of the pinion 32, through the engagement of the rack 22 and the pinion 32, effectuates the lateral translation of the rack 22 relative to the vehicle. The lateral translation of the rack 22 causes the front steerable wheels 28 to angle relative to the vehicle, thereby altering the direction of travel while the vehicle is moving.

The rear steering mechanism 16 comprises a rack shaft 36, a rack 38 disposed intermediately between opposing ends of the rack shaft 36, tie rods 40 disposed on each opposing end of the rack shaft 36, a knuckle arm 42 connected to each tie rod 40, and a rear steerable wheel 44 rotatably disposed on each knuckle arm 42. The rack shaft 36, tie rods 40, and knuckle arms 42 are configured such that rear steerable wheels 44, like the front steerable wheels 28, can be pivoted in unison relative to the vehicle to steer the vehicle upon lateral translation of the rack 38.

The rear steering mechanism 16 further comprises a mechanism through which the rear steerable wheels 44 can similarly be pivoted. Such a mechanism comprises a motor 46 operably connected to the rack 38 through a drive mechanism 48. The drive mechanism 48, through a pinion 49, transfers the rotational motion of a rotor shaft 47 of the motor 46 to linear motion of the rack 38, which effectuates the lateral motion of the rack shaft 36 and, ultimately, the pivoting of the rear steerable wheels 44.

The vehicle is further provided with a steering sensor 50 for detecting an angular position of the steering column 30, a vehicle speed sensor 52, and a rear rack shaft displacement sensor 58. The rear rack shaft displacement sensor 58 detects the displacement of its corresponding rack shaft 36 from a reference position, which is the position in which each rear steerable wheel 44 is aligned and rotatable.

The controller 18 is disposed in signal communication with the various systems of the vehicle. The controller 18 receives informational signals from each of the systems, quantifies the received information, and provides an output command signal in response thereto, such as in this instance, for example, to the rear steering mechanism 16 through the motor 46.

In order to perform the prescribed functions and desired processing, as well as the computations therefore, (e.g., the execution of the rear wheel steering algorithms, and the like), the controller 18 may include, but need not be limited to, processors, computers, memory, storage, registers, timing devices, interrupts, communication interfaces, input/output signal interfaces, and the like, as well as combinations comprising at least one of the foregoing. For example, the controller 18 may include input signal filtering to enable accurate sampling and conversion or acquisition of such signals from communications interfaces.

Figure 2:
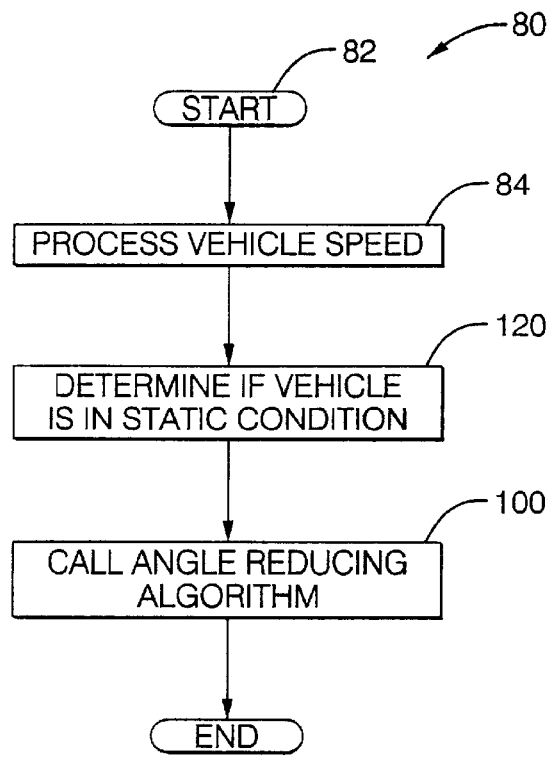
FIG. 2 is a flow diagram illustrating a method for controlling the rear steering angle of the four wheel steering system of FIG. 1.

Referring to FIG. 2 a simplified flow diagram depicting rear wheel steering angle control is depicted. More particularly, a method for static steering angle reduction in rear wheel steering systems indicated generally by the reference numeral 80, which method is implemented by the controller 18 of FIG. 1. The method might be one of numerous processes executed by controller 18 for controlling the rear wheel steering angle of a vehicle. Beginning with a start block 82, the method proceeds to block 84, where the vehicle speed processed to facilitate later computations. Such processing may include simple filtering or scheduling. For example, vehicle speed sensor may produce a vehicle speed signal, which includes noise, offsets, or other inaccuracies and undesirable characteristics, which if utilized by the algorithms executed in controller 18 may yield undesirable results.

Continuing now to process 120, a determination is made if the vehicle is in a static condition. Next, at process depicted at 100, if the vehicle is determined to be in a static condition, a static steering angle reduction algorithm 100 is executed.

Figure 3:
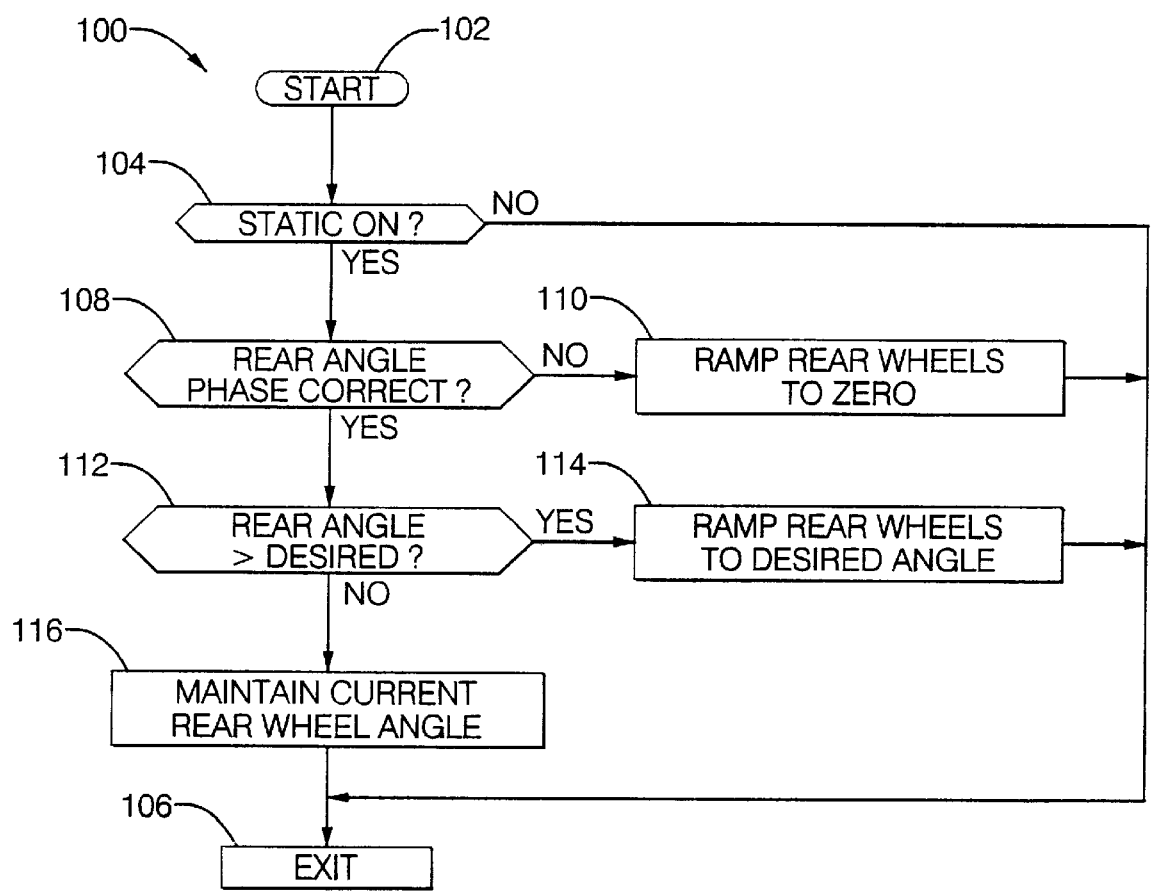
FIG. 3 is a flow diagram illustrating a method for static steering angle reduction for a substantially stopped vehicle.

Referring to FIG. 3, a static steering angle reducing algorithm for reducing the rear wheel steering angle of a substantially stopped vehicle is indicated generally by the reference numeral 100, which method is implemented by the controller 18 of FIG. 1. Beginning with a start block 102, the method proceeds to a decision block 104, where the vehicle speed is checked to see if it is below a static threshold. If the speed is greater than or equal to the static threshold, the method exits at block 106. However, if the speed is less than the threshold, the method proceeds to decision block 108, which checks to determine if the rear steering angle phase is correct for low-speed maneuverability. If the phase is not correct for low-speed maneuverability, such as, for example, where the correct phase is defined by a rear steering angle having a sign opposite to that of a front steering angle, the rear wheel steering angle is ramped towards zero at block 110. However, if the rear steering angle phase is correct for low speed maneuverability, the process 100 determines whether the rear wheel steering angle is greater than the desired rear wheel steering angle at decision block 112. If the rear wheel steering angle is greater than the desired angle, then the rear wheel steering angle is ramped down to the desired angle at block 114. However, if the rear wheel steering angle is less than or equal to the desired steering angle, then the current rear wheel steering angle is maintained at block 116.

Figure 4:
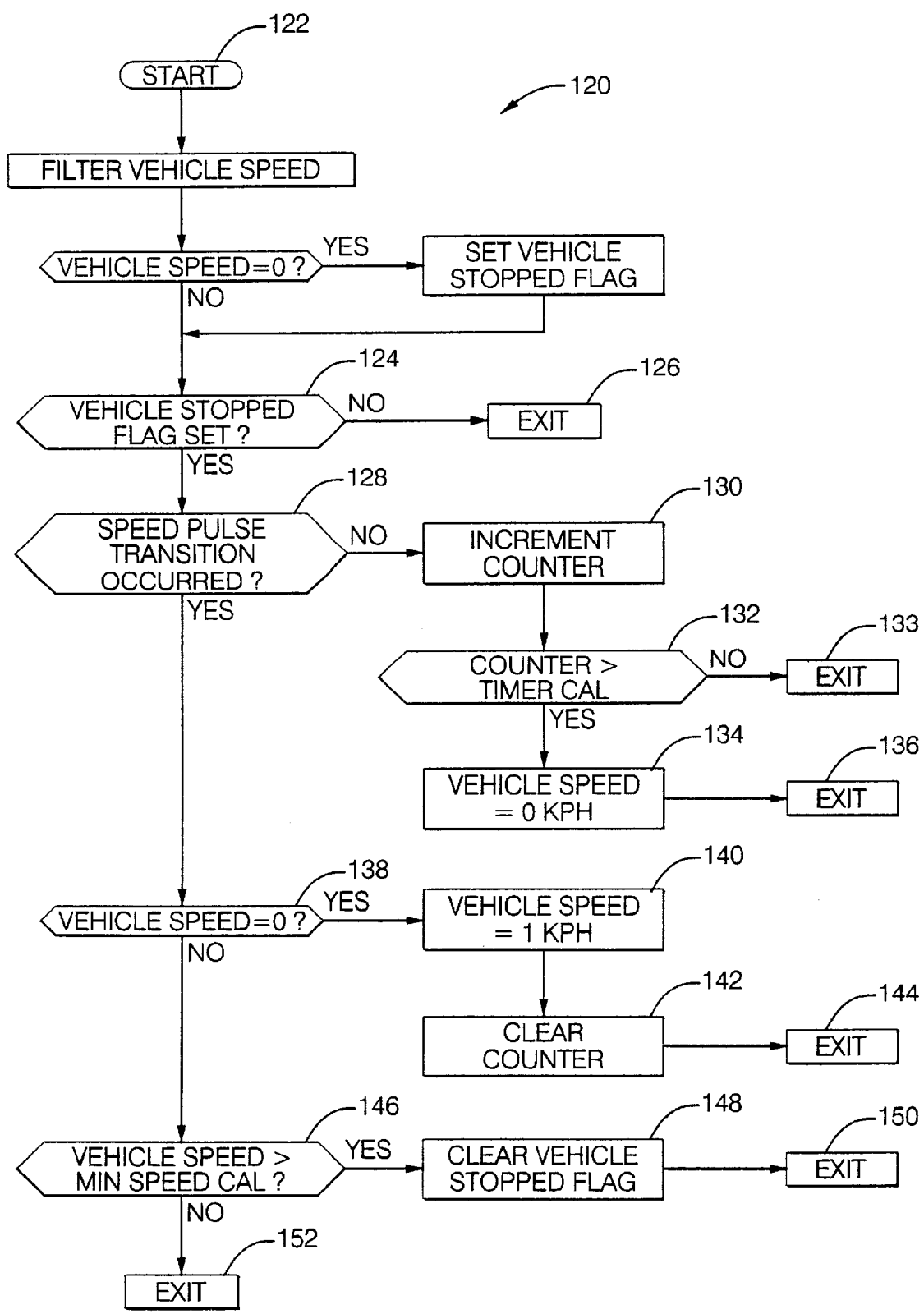
FIG. 4 is a flow diagram illustrating a method for a method for determining whether the vehicle is substantially stopped.

Turning now to FIG. 4, a method for determining whether the vehicle is substantially stopped (e.g., static) is indicated generally by the reference numeral 120, which method is also implemented by the controller 18 of FIG. 1. In an exemplary embodiment, the method is employed to determine if a vehicle is substantially stopped, or at least rolling. Beginning with a start block 122, the method proceeds to a decision block 124 where a flag indicative of a stopped vehicle is checked. If the flag is false, indicating that the vehicle is not stopped, the method exits at exit block 126. However, if the flag is set, indicating that the vehicle is stopped, control is passed to a decision block 128 for determining whether a speed pulse transition has occurred. If no speed pulse transition has occurred, control is passed to block 130 to increment a counter, and thence to decision block 132 to check if the counter is greater than a timer calibration value. If the counter is not greater than the timer calibration value, there is an indication that the vehicle is moving, and the method exits at exit block 133. If the counter exceeds the timer calibration value, indicating there has been no detection of a speed pulse transition, the method continues to block 134 to set the vehicle speed variable equal to zero to prepare for later cycles, and thence to block 136 to exit the method.

If the result of decision block 128 is true, indicating that a speed pulse transition has occurred, then the method continues to a decision block 138 for checking whether the vehicle speed variable is equal to zero. If the speed variable is equal to zero, block 140 is executed to set the vehicle speed variable equal to a selected non-zero value, such as, for example, 1 k.p.h. (kilometer per hour). Block 142 follows block 140 and clears the counter variable before passing control to exit block 144.

If the result of decision block 138 is false, indicating that the vehicle speed variable is not equal to zero, then control is passed to a decision block 146 for determining whether the vehicle speed variable is greater than a minimum speed calibration value. The minimum speed calibration value of block 146 is preferably chosen to be just large enough to insure that the vehicle is moving For example, greater than about 1 k.p.h., such as, for example, about 2 k.p.h. If the vehicle speed variable is greater than the minimum speed calibration value, block 148 clears the vehicle-stopped flag before exiting via exit block 150. If, on the other hand, the vehicle speed variable is not greater than the minimum speed calibration value at decision block 146, the method exits via exit block 152.

In operation, steering the rear wheels under static conditions places high load requirements on the electric motor. If the four-wheel steering system did not static steer and the rear wheels were not phased correctly, a driver might find it difficult to maneuver the vehicle, especially in certain low speed situations for example, parking. It will be appreciated that the static steer angle-reducing algorithm reduces the otherwise commanded static steer requirements, on the system without impacting driver ability to maneuver the vehicle in comparison to a non-four wheel steering vehicle. It is also noteworthy to recognize that the static steer angle reducing algorithm only steers the rear wheels toward center (e.g., zero degrees) when the likelihood of the vehicle reaching a threshold speed is low. Moreover, the rear wheels are ramped to zero if the current angle is incorrect in phase since incorrect phase would make it harder to maneuver. If the rear wheels are the correct phase and the rear wheel angle is greater than the desired angle, the rear wheel steering angle is ramped down to the desired angle. If the actual rear wheel steering angle is less than desired, the rear wheels stay at their current position as prescribed in FIG. 3.

To receive the maximum benefit of improved maneuverability, the static steering angle reducing algorithm is preferably operated only when the vehicle is not moving and disabled when the vehicle rolls. The algorithm works well with speed sensors and/or vehicle bus information, such as is used in production four-wheel steering systems, to help determine whether the vehicle is rolling.

FIG. 4 depicts another embodiment disclosing an improvement for detecting vehicle speed by recognizing the first speed pulse. If another speed pulse is not received within a calibratable amount of time, the vehicle speed variable is reset to zero, as prescribed in FIG. 4. When the static flag transitions to off to indicate that the vehicle is rolling, the static steering angle reducing algorithm (shown generally as 100 in FIG. 2) will exit and the rear wheels will be ramped to the normally desired position by other methods employed in the controller, as will be recognized by those of ordinary skill in the pertinent art.

Advantages of the static steering angle reducing algorithm include that the reduced controller duty cycle requirements may lower controller costs, the torque requirements of the system may be reduced, and with reduced torque requirements, the gear ratios at the actuator may be changed to achieve improved bandwidth to benefit closed-loop control algorithms.

The above-described methodology provides a robust method to neutralize the rear wheel steering angle, thereby improving static motor loading and very low speed turning of a vehicle. In addition, the present teachings may be embodied in the form of computer-implemented processes and apparatuses for practicing those processes. The present teachings can also be embodied in the form of computer program code containing instructions embodied in tangible media, such as floppy diskettes, CD-ROMs, hard drives, or any other computer-readable storage media 60, wherein, when the computer program code is loaded into and executed by a computer, the computer becomes an apparatus for practicing the teachings of the present disclosure.

The teachings of the present disclosure can also be embodied in the form of computer program code, for example, whether stored in a storage medium 60, loaded into and/or executed by a computer or controller 18, or as data signal 62 transmitted, whether by a modulated carrier wave or not, over some transmission medium, such as over electrical wiring or cabling, through fiber optics, or via electromagnetic radiation, wherein, when the computer program code is loaded into and executed by a computer or controller, the computer becomes an apparatus for practicing the teachings herein. When implemented on a general-purpose microprocessor, the computer program code segments configure the microprocessor to create specific logic circuits.

While the disclosure has been made with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for controlling a rear steering angle of a vehicle, comprising:

calibrating a static vehicle speed threshold;

detecting an actual vehicle speed below said static vehicle speed threshold;

determining whether a phase of a rear steering angle is correct in response to said detected speed below threshold;

ramping to zero said rear steering angle if said phase is not correct;

deciding whether said rear steering angle is greater than a desired rear steering angle if said phase is correct; and ramping down said rear steering angle to said desired rear steering angle in response to said decidedly greater angle.

2. The method of claim 1 wherein said static vehicle speed threshold is substantially one kilometer per hour.

3. The method of claim 1 wherein said calibrating comprises selecting a detectable speed above which said vehicle is considered to be in motion.

4. The method of claim 1 wherein said detecting comprises detecting at least one speed pulse transition.

5. The method of claim 1 wherein said detecting comprises detecting an actual vehicle speed above a static vehicle speed threshold value.

6. The method of claim 1 wherein said determining comprises comparing a relative direction of said rear steering angle with that of a front steering angle to ascertain that they are not both left or both right.

7. The method of claim 1 wherein said ramping to zero comprises commanding a motor for rear steering to approach a zero steering angle position.

8. The method of claim 1 wherein said deciding comprises comparing said rear steering angle with a desired rear steering angle for low-speed maneuverability.

9. The method of claim 1 wherein said ramping down comprises commanding a motor for rear steering to approach said desired rear steering angle position.

10. A storage medium encoded with a machine readable computer program code said code including instructions for causing a computer to implement a method for controlling a rear steering angle of a vehicle, the method comprising:
calibrating a static vehicle speed threshold;
detecting an actual vehicle speed below said static vehicle speed threshold;
determining whether a phase of a rear steering angle is correct in response to said detected speed below threshold;
ramping to zero said rear steering angle if said phase is not correct;
deciding whether said rear steering angle is greater than a desired rear steering angle if said phase is correct; and
ramping down said rear steering angle to said desired rear steering angle in response to said decidedly greater angle.

11. A computer data signal comprising:

comprising code configured to cause a processor to implement a method for controlling a steering angle of a vehicle, the method comprising:
- calibrating a static vehicle speed threshold;
- detecting an actual vehicle speed below said static vehicle speed threshold;
- determining whether a phase of a rear steering angle is correct in response to said detected speed below threshold;
- ramping to zero said rear steering angle if said phase is not correct;
- deciding whether said rear steering angle is greater than a desired rear steering angle if said phase is correct; and
- ramping down said rear steering angle to said desired rear steering angle in response to said decidedly greater angle.

12. A vehicle steering apparatus comprising:

an actuator in operable communication with steerable rear wheel through a tie rod, said actuator comprising:
- a steering rack linked to said tie rod;
- an electric motor having an output shaft meshingly engaged with said steering rack; and
- a controller comprising:
  - means for calibrating a static vehicle speed threshold;
  - means for detecting an actual vehicle speed below said static vehicle speed threshold;
  - means for determining whether the phase of a rear steering angle is correct in response to said detected speed below threshold;
  - means for ramping to zero said rear steering angle if said phase is not correct;
  - means for deciding whether said rear steering angle is greater than a desired rear steering angle if said phase is correct; and
  - means for ramping down said rear steering angle to said desired rear steering angle in response to said decidedly greater angle.

13. A controller for providing a static steering angle reducing algorithm for rear wheel steering, the controller comprising:
- means for calibrating a static vehicle speed threshold;
- means for detecting an actual vehicle speed below said static vehicle speed threshold;
- means for determining whether the phase of a rear steering angle is correct in response to said detected speed below threshold;
- means for ramping to zero said rear steering angle if said phase is not correct;
- means for deciding whether said rear steering angle is greater than a desired rear steering angle if said phase is correct; and
- means for ramping down said rear steering angle to said desired rear steering angle in response to said decidedly greater angle.

14. A controller for a rear-wheel steering system, the controller comprising:
- a first decision function for detecting a flag indicative of a stopped vehicle;
- a second decision function in signal communication with the first decision function for detecting a speed pulse transition;
- a counter in signal communication with the second decision function for incrementing a counter value; and
- a third decision function in signal communication with the counter for detecting a counter value that has reached a timer calibration value to thereby reset a vehicle speed variable in accordance therewith.

15. A controller as defined in claim 14, further comprising:
- a fourth decision function for determining whether the rear steering angle phase is correct; and
- a first ramp function in signal communication with the fourth decision function for ramping the rear wheel steering angle to zero.

16. A controller as defined in claim 15, further comprising:
- a fifth decision function for determining whether the rear steering angle is greater than a desired angle; and
- a second ramp function in signal communication with the fifth decision function for ramping the rear wheel steering angle to the desired angle.

* * * * *